(12) United States Patent
Tsuchiya

(10) Patent No.: US 12,307,148 B2
(45) Date of Patent: *May 20, 2025

(54) IMAGE FORMING APPARATUS FOR DETERMINING A COMMUNICATION CHANNEL TO BE USED IN A WIRELESS COMMUNICATION

(71) Applicant: CANON KABUSHIKI KAISHA, Tokyo (JP)

(72) Inventor: Keigo Tsuchiya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,773

(22) Filed: Nov. 14, 2023

(65) Prior Publication Data

US 2024/0086132 A1 Mar. 14, 2024

Related U.S. Application Data

(63) Continuation of application No. 18/174,778, filed on Feb. 27, 2023, now Pat. No. 11,853,632.

(30) Foreign Application Priority Data

Mar. 1, 2022 (JP) .................................. 2022-031122

(51) Int. Cl.
G06F 3/12 (2006.01)
H04W 72/044 (2023.01)
H04W 84/18 (2009.01)

(52) U.S. Cl.
CPC ............ G06F 3/1292 (2013.01); G06F 3/122 (2013.01); G06F 3/1236 (2013.01); H04W 72/044 (2013.01); H04W 84/18 (2013.01)

(58) Field of Classification Search
None
See application file for complete search history.

(56) References Cited

U.S. PATENT DOCUMENTS

| | | | |
|---|---|---|---|
| 2014/0320910 A1* | 10/2014 | Shimazaki | H04N 1/32771 358/1.15 |
| 2016/0360065 A1* | 12/2016 | Shimazaki | G06F 3/1203 |
| 2017/0041400 A1* | 2/2017 | Asakura | H04W 4/80 |
| 2017/0359251 A1* | 12/2017 | Iwauchi | H04L 45/22 |
| 2019/0079711 A1* | 3/2019 | Hirano | G06F 3/1204 |
| 2019/0239259 A1* | 8/2019 | Kunimatsu | G06F 3/1226 |
| 2019/0268751 A1* | 8/2019 | Moriya | H04W 8/005 |
| 2021/0405940 A1* | 12/2021 | Tsuchiya | G06F 3/1292 |

FOREIGN PATENT DOCUMENTS

| | | | |
|---|---|---|---|
| JP | 2017539179 A | | 12/2017 |
| JP | 2019193143 A | | 10/2019 |
| JP | 2019527961 A | | 10/2019 |
| JP | 2022011085 A | | 1/2022 |
| WO | 2021002802 A1 | | 1/2021 |
| WO | WO-2021029555 A1 | * | 2/2021 |

* cited by examiner

*Primary Examiner* — Huo Long Chen
(74) *Attorney, Agent, or Firm* — Canon U.S.A., Inc. IP Division

(57) ABSTRACT

In a case where an image forming apparatus operates as a master station that determines a communication channel to be used in wireless communication, the image forming apparatus transmits a second trigger frame, which is compliant with the Institute of Electrical and Electronics Engineers (IEEE) 802.11 standard and includes information indicating that carrier sense is to be executed, to a slave station apparatus connected to the master station.

16 Claims, 9 Drawing Sheets

FIG.6

| 601 | 602 | 603 | 604 | 605 | 606 | 607 | 608 | 609 |
|---|---|---|---|---|---|---|---|---|
| TRIGGER TYPE | UL LENGTH | CASCADE INDICATION | CS REQUIRED | BW | GI AND LTF TYPE | MU-MIMO LTF MODE | NUMBER OF HE-LTF SYMBOLS | STBC |

FIG.7

| 701 | 702 | 703 | 704 | 705 | 706 | 707 | 708 | 709 |
|---|---|---|---|---|---|---|---|---|
| AID12 | RU ALLOCATION | FEC CODING TYPE | UL HE-MCS | UL DCM | SS ALLOCATION /RA-RU INFORMATION | TARGET RSSI | RESERVED | TRIGGER DEPENDENT USER INFO |

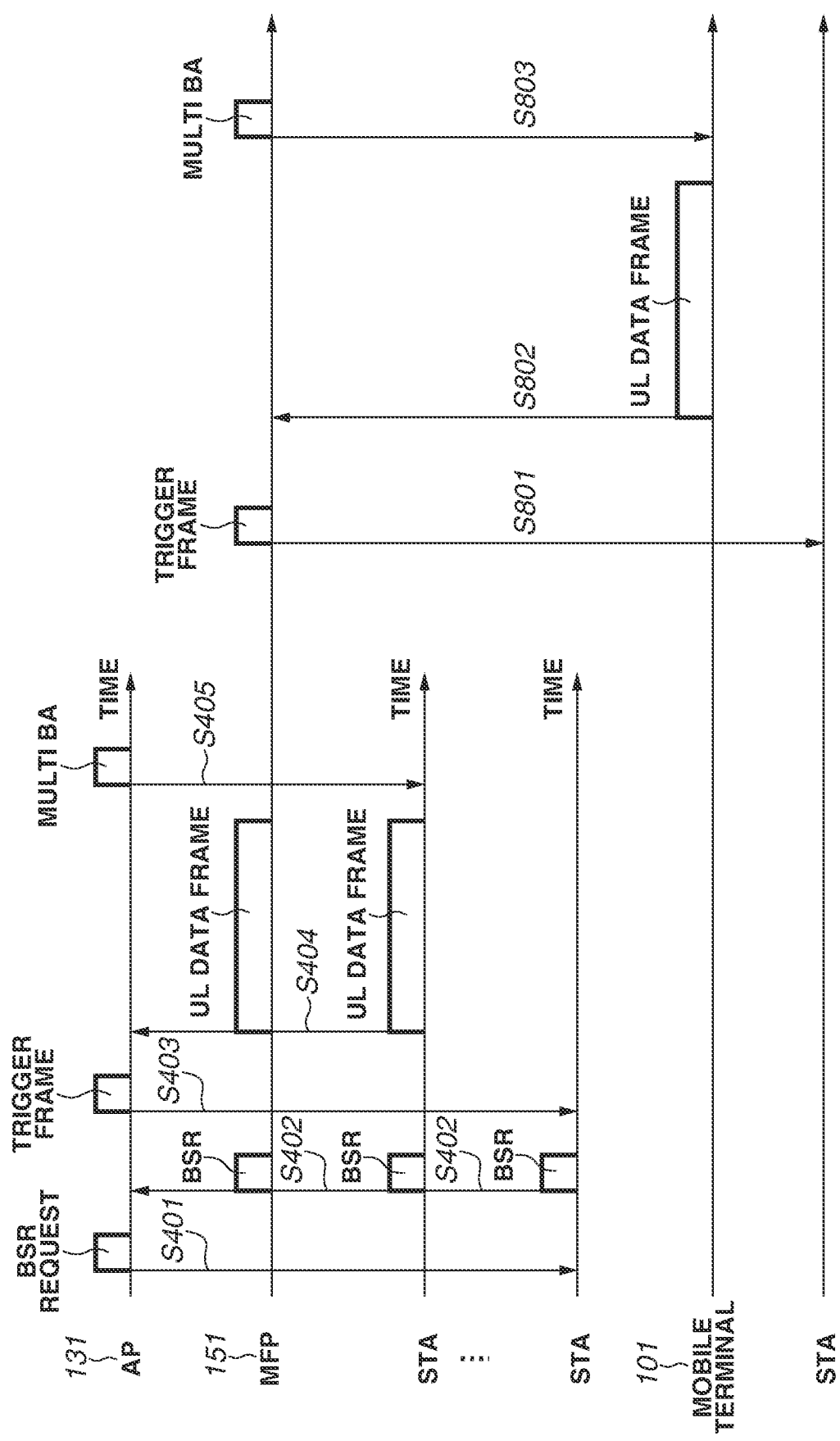

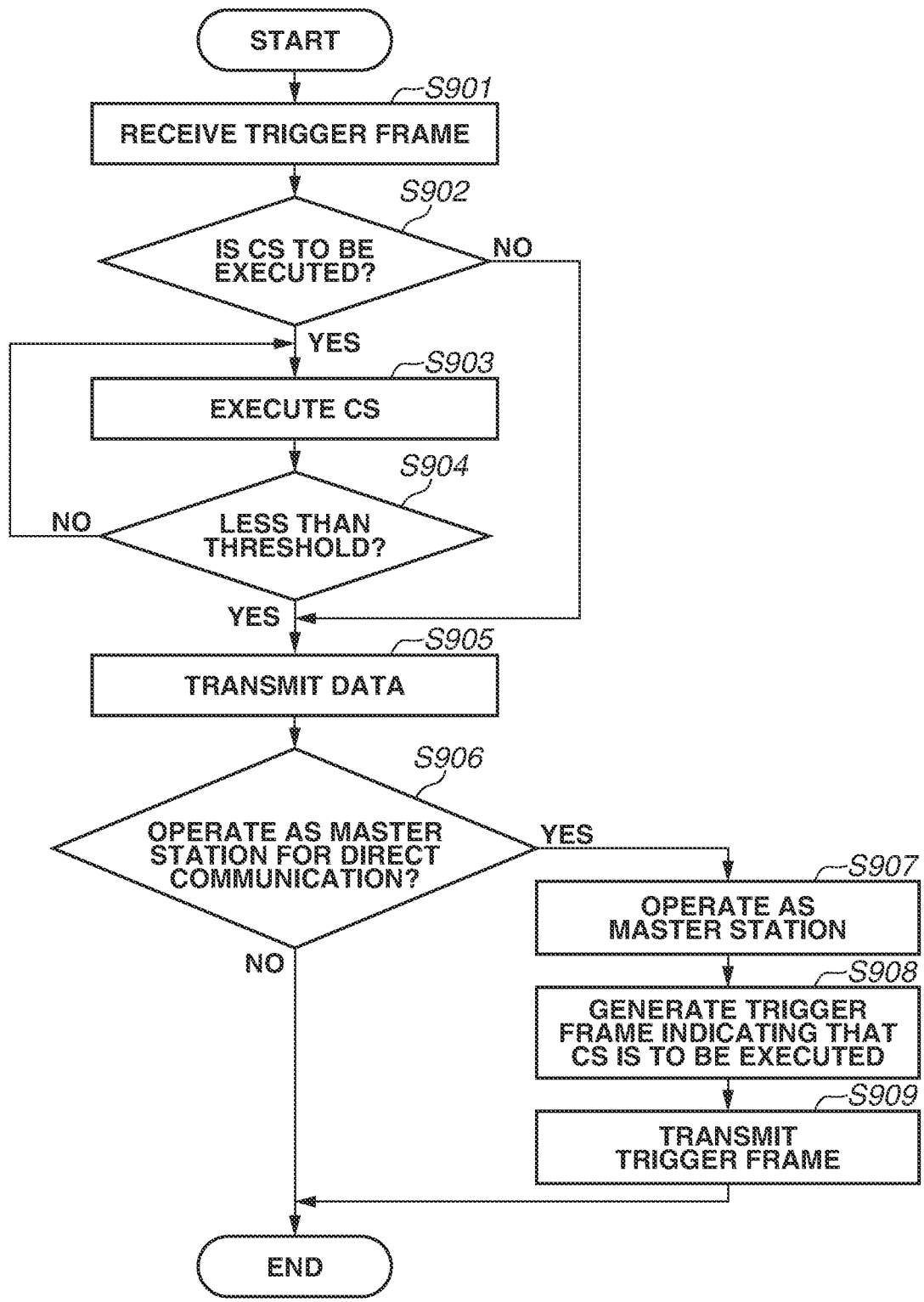

IMAGE FORMING APPARATUS FOR DETERMINING A COMMUNICATION CHANNEL TO BE USED IN A WIRELESS COMMUNICATION

CROSS-REFERENCE TO RELATED APPLICATIONS

This application is a Continuation of U.S. patent application Ser. No. 18/174,778 filed Feb. 27, 2023, which claims priority benefit of Japanese Application No. 2022-031122 filed Mar. 1, 2022. The disclosures of the above-named applications are hereby incorporated by reference herein in their entireties.

BACKGROUND OF THE INVENTION

Field of the Invention

The present invention relates to an image forming apparatus.

Description of the Related Art

Japanese Patent Application Laid-Open No. 2012-19487 discusses a technique in which an image forming apparatus can perform wireless communication in an infrastructure mode and wireless communication in an ad hoc mode in parallel via an access point.

In recent years, wireless communication has been used in various cases, and the provision of convenient wireless communication is desired.

SUMMARY OF THE INVENTION

According to an aspect of the present invention, an image forming apparatus includes a communication control unit configured to enable both a first mode for performing wireless communication via an external access point, wherein the external access point is located outside the image forming apparatus, and a second mode in which wireless communication is not performed via the external access point outside the image forming apparatus, a reception unit configured to receive a first trigger frame compliant with the Institute of Electrical and Electronics Engineers (IEEE) 802.11 standard from the external access point while the first mode and the second mode are enabled, the first trigger frame including information regarding execution of carrier sense, a first transmission unit configured to, in a case where the first trigger frame includes information indicating that the carrier sense is to be executed, execute the carrier sense and then transmit data, a second transmission unit configured to, in a case where the image forming apparatus operates as a master station that is configured to determine a communication channel to be used in the wireless communication in the second mode while the first mode and the second mode are enabled, transmit a second trigger frame compliant with the IEEE 802.11 standard to a slave station apparatus connected to the master station, the second trigger frame including information indicating that the carrier sense is to be executed, and a printing processing unit configured to perform printing processing on a sheet based on print data received from the slave station apparatus.

Further features of the present invention will become apparent from the following description of exemplary embodiments with reference to the attached drawings.

BRIEF DESCRIPTION OF THE DRAWINGS

FIG. 6 is a diagram illustrating an example of a frame structure.

FIG. 7 is a diagram illustrating an example of a frame structure.

FIG. 8 is a diagram illustrating an example of the communication processing according to the present exemplary embodiment.

FIG. 9 is a flowchart illustrating processing performed by the image forming apparatus.

DESCRIPTION OF THE EMBODIMENTS

An exemplary embodiment of the present invention will be described in detail below with reference to the drawings. The exemplary embodiment is merely an example, and specific examples of components, processing steps, and display screens described in the exemplary embodiment are not intended to limit the scope of the present invention unless otherwise specified.

<System Configuration>

Figure 1:
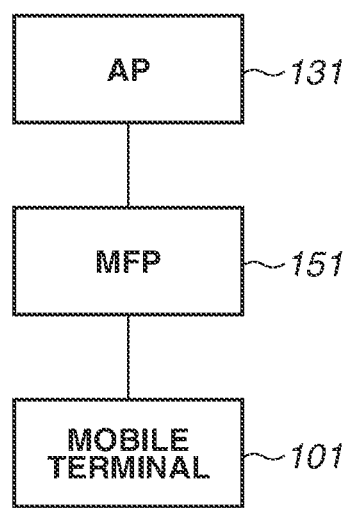
FIG. 1 is a diagram illustrating an example of a configuration of a system according to an exemplary embodiment.

FIG. 1 illustrates an example of a configuration of a system according to an exemplary embodiment of the present invention. The system is an example of a wireless communication system where a plurality of communication apparatuses can wirelessly communicate with each other. In the example of FIG. 1, the system includes an access point 131, a multifunction peripheral (MFP) 151, and a mobile terminal 101. The mobile terminal 101 is an example of a mobile terminal and is a laptop personal computer or a smartphone.

The MFP 151 has a printing function, a reading function (a scanner function), and a facsimile function. The MFP 151 according to the present exemplary embodiment also has a communication function capable of wirelessly communicating with the mobile terminal 101. While a case where the MFP 151 is used as an image forming apparatus is described in the present exemplary embodiment, the present exemplary embodiment is not limited thereto. For example, a facsimile apparatus, a scanner apparatus, a projector, or a single-function printing apparatus may be used instead of the MFP 151. In the present exemplary embodiment, an apparatus having a printing function is also referred to as an image forming apparatus.

The access point 131 is provided separately from (outside) the mobile terminal 101 and the MFP 151, and operates as a base station apparatus in a wireless local area network (WLAN). The access point 131 is also referred to as the external access point 131 or the external wireless base station (or the external master station). The MFP 151 having a WLAN communication function can perform communication in a WLAN infrastructure mode via the access point 131. Hereinafter, an access point is also referred to as an "AP". The infrastructure mode is also referred to as the "wireless infrastructure mode".

The infrastructure mode is a mode in which the MFP 151 communicates with another apparatus via an external apparatus (e.g., the access point 131) forming a network. A connection to the external access point 131 established by the MFP 151 operating in the infrastructure mode is referred to as an infrastructure connection. In the present exemplary embodiment, in the infrastructure connection, the MFP 151 operates as a slave station, and the external access point 131 operates as a master station. In the present exemplary embodiment, the master station refers to an apparatus that determines a communication channel to be used in a network to which the master station belongs, and the slave station refers to an apparatus that does not determine a communication channel to be used in a network to which the slave station belongs, and uses the communication channel determined by the master station.

The access point 131 wirelessly communicates with a communication apparatus (an authenticated communication apparatus) permitted to connect to the access point 131, and relays wireless communication between the communication apparatus and another communication apparatus. The access point 131 can also be connected to, for example, a wired communication network and can relay wireless communication between a communication apparatus connected to the wired communication network and another communication apparatus wirelessly connected to the access point 131.

The mobile terminal 101 and the MFP 151 can wirelessly communicate with each other in the wireless infrastructure mode via the external access point 131 or in a peer-to-peer mode not via the external access point 131, using respective WLAN communication functions of the mobile terminal 101 and the MFP 151. Hereinafter, peer-to-peer is referred to as "P2P". Communication not performed via the external access point 131 is also referred to as direct wireless communication. The P2P mode includes Wi-Fi Direct® and a software AP mode. The P2P mode can also be compliant with the Institute of Electrical and Electronics Engineers (IEEE) 802.11 series.

The P2P mode refers to a mode in which the MFP 151 directly communicates with another apparatus such as the mobile terminal 101. That is, the communication is not performed via an external apparatus that forms a network. In the present exemplary embodiment, the P2P mode includes an AP mode where the MFP 151 operates as an access point. Connection information (a Service Set Identifier (SSID) and a password) relating to the access point enabled in the MFP 151 in the AP mode can be optionally set by a user. The P2P mode may include, for example, a Wi-Fi Direct® mode for the MFP 151 to communicate using Wi-Fi Direct®. Which of Wi-Fi Direct®-compatible devices is to operate as the master station is determined, for example, according to a sequence termed "group owner negotiation". Alternatively, the master station may be determined without executing the group owner negotiation. An apparatus that is a Wi-Fi Direct®-compatible device and serves as the master station is particularly referred to as a group owner. A connection to another apparatus established by the MFP 151 operating in the P2P mode is referred to as a direct connection. In the present exemplary embodiment, in the direct connection, the MFP 151 operates as the master station, and another apparatus (e.g., the mobile terminal 101) operates as the slave station.

Figure 2A:
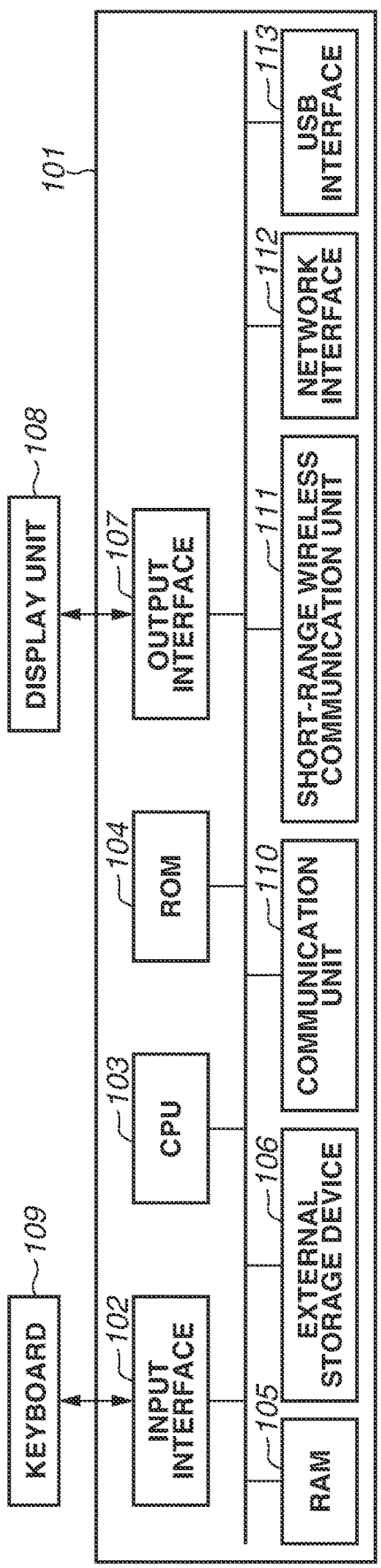
FIG. 2A is a block diagram illustrating an example of a hardware configuration of a mobile terminal.
Figure 2B:
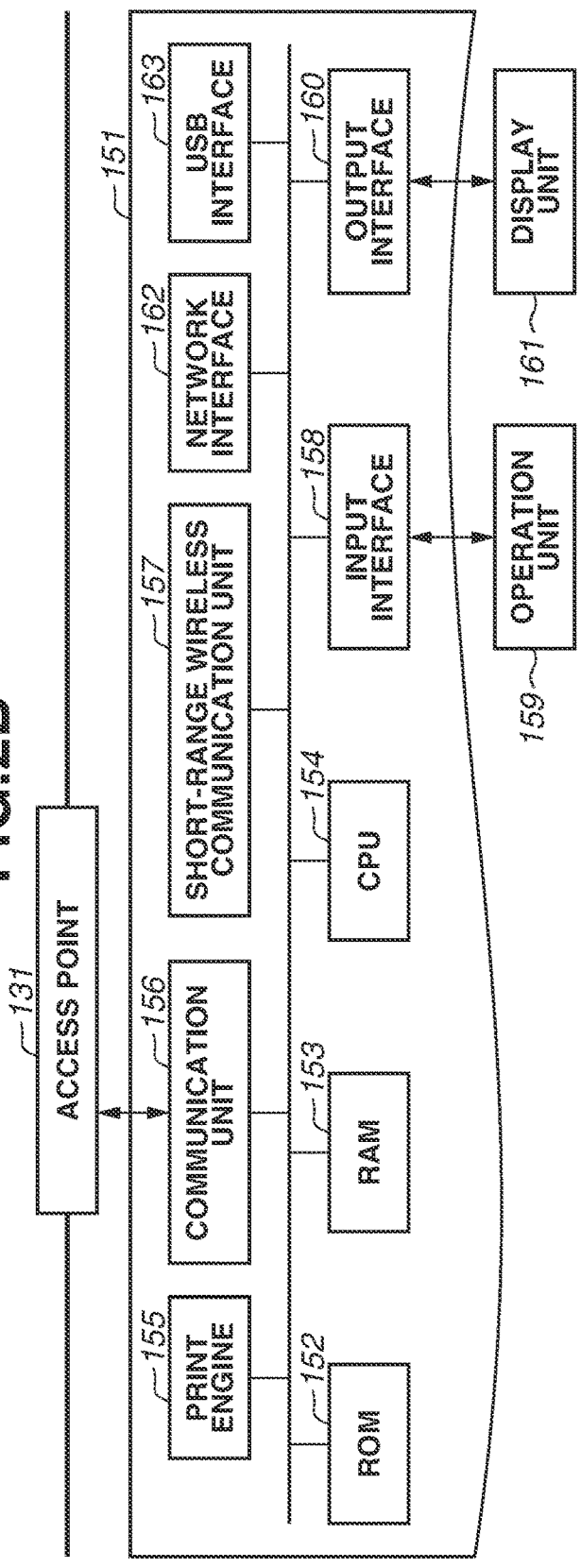
FIG. 2B is a block diagram illustrating an example of a hardware configuration of an image forming apparatus.

Next, a description will be given of a configuration of the mobile terminal 101 according to the present exemplary embodiment and a configuration of the communication apparatus (the MFP 151) capable of communicating with the mobile terminal 101 according to the present exemplary embodiment with reference to FIGS. 2A and 2B, respectively. While the present exemplary embodiment is described taking the following configurations as examples, the present exemplary embodiment is applicable to any apparatus capable of communicating with a communication apparatus, and the functions are not particularly limited to those illustrated in FIGS. 2A and 2B.

The mobile terminal 101 includes an input interface 102, a central processing unit (CPU) 103, a read-only memory (ROM) 104, a random-access memory (RAM) 105, an external storage device 106, an output interface 107, a display unit 108, a keyboard 109, a communication unit 110, a short-range wireless communication unit 111, a network interface 112, and a Universal Serial Bus (USB) interface 113. The CPU 103, the ROM 104, and the RAM 105 form a computer of the mobile terminal 101.

The input interface 102 receives input data or an operation instruction from the user operating an operation unit such as the keyboard 109. The operation unit may be a physical keyboard or physical buttons, or may be a software keyboard or software buttons displayed on the display unit 108. In other words, the input interface 102 may receive an input (an operation) from the user through the display unit 108.

The CPU 103 is a system control unit and controls the entire mobile terminal 101. The ROM 104 stores fixed data such as control programs to be executed by the CPU 103, a data table, and an embedded operating system (hereinafter referred to as an embedded OS). In the present exemplary embodiment, the control programs stored in the ROM 104 perform software execution control such as scheduling, task switching, and interrupt processing under control of the embedded OS stored in the ROM 104.

The RAM 105 includes a static random-access memory (SRAM) using a backup power supply. In the RAM 105, data is held by a primary battery (not illustrated) for data backup. Thus, the RAM 105 can store important data such as a program control variable without volatilizing the data. A memory area for storing setting information regarding the mobile terminal 101 and management data on the mobile terminal 101 is also provided in the RAM 105. The RAM 105 is also used as a main memory or a work memory of the CPU 103.

The external storage device 106 stores a print information generation program for generating print information that can be interpreted by the MFP 151. The output interface 107 controls the display unit 108 to display data or provide a notification of the state of the mobile terminal 101.

The display unit 108 includes a light-emitting diode (LED) or a liquid crystal display (LCD). The display unit 108 displays data or provides a notification of the state of the mobile terminal 101. The communication unit 110 is configured to connect to an apparatus such as the MFP 151 or the access point (AP) 131 to perform data communication. For example, the communication unit 110 is connectable to the access point (not illustrated) in the MFP 151. The communication unit 110 and the access point in the MFP 151 are connected to each other, whereby the mobile terminal 101 and the MFP 151 can perform P2P communication therebetween. The communication unit 110 may directly communicate with the MFP 151 through wireless communication, or may communicate with the MFP 151 via an external apparatus outside the mobile terminal 101 and the MFP 151. Examples of the external apparatus include an external access point (e.g., the access point 131) outside the mobile terminal 101 and the MFP 151, and an apparatus, other than an access point, capable of relaying communication. In the present exemplary embodiment, the wireless communication method used by the communication unit 110 is Wireless Fidelity (Wi-Fi®) which is a communication standard compliant with the IEEE 802.11 series. Examples of the access point 131 include a device such as a WLAN router.

The short-range wireless communication unit 111 is configured to wirelessly connect to an apparatus such as the MFP 151 over a short range to perform data communication. The short-range wireless communication unit 111 performs communication using a communication method different from that of the communication unit 110.

The short-range wireless communication unit 111 is connectable to, for example, a short-range wireless communication unit 157 in the MFP 151. Examples of the communication method include near-field communication (NFC), Bluetooth® Classic, Bluetooth® Low Energy, and Wi-Fi Aware®.

The network interface 112 is a connection interface (I/F) that controls wireless communication and communication processing via a wired LAN cable.

The USB interface 113 is a connection I/F that controls a USB connection via a USB cable. More specifically, the USB interface 113 connects to an apparatus such as the MFP 151 or the external access point 131 via a USB cable to perform data communication.

Next, the MFP 151 will be described in relation to FIG. 2B. The MFP 151 includes a ROM 152, a RAM 153, a CPU 154, a print engine 155, a communication unit 156, the short-range wireless communication unit 157, an input interface 158, an operation unit 159, an output interface 160, a display unit 161, a network interface 162, and a USB interface 163. The ROM 152, the RAM 153, and the CPU 154 form a computer of the MFP 151.

The communication unit 156 controls communication processing using the respective interfaces. For example, the MFP 151 can operate in the infrastructure mode and the P2P mode which are communication modes using the communication unit 156.

More specifically, the communication unit 156 can operate as an internal access point inside the MFP 151. For example, the user instructs the MFP 151 to enable the internal access point, whereby the MFP 151 operates as an access point. In the present exemplary embodiment, the wireless communication method used by the communication unit 156 is a communication standard compliant with the IEEE 802.11 series. In the following description, Wi-Fi® (Wi-Fi® communication) is a communication standard compliant with the IEEE 802.11 series. The communication unit 156 may include hardware functioning as an access point, or may operate as an access point using software for causing the communication unit 156 to function as an access point. In a case where the MFP 151 operates as the master station, the communication unit 156 can maintain P2P wireless connections with a predetermined number or less than the predetermined number of (e.g., three or less) slave station apparatuses in parallel. For example, the P2P wireless connection may be maintained with three slave stations in parallel or it may be maintained with less than three slave stations in parallel. The communication unit 156 can perform wireless communication using a frequency band selected from among 2.4 GHz, 5 GHz, and 6 GHz.

The short-range wireless communication unit 157 is configured to wirelessly connect to an apparatus such as the mobile terminal 101 over a short range, and is connectable to, for example, the short-range wireless communication unit 111 in the mobile terminal 101. Examples of the communication method include NFC, Bluetooth® Classic, Bluetooth® Low Energy, and Wi-Fi Aware®.

The RAM 153 includes an SRAM using a backup power supply. In the RAM 153, data is held by a primary battery (not illustrated) for data backup. Thus, the RAM 153 can store important data such as a program control variable without volatilizing the data. A memory area for storing setting information regarding the MFP 151 and management data on the MFP 151 is also provided in the RAM 153. The RAM 153 is also used as a main memory or a work memory of the CPU 154. The RAM 153 stores a reception buffer for temporarily storing print information received from the mobile terminal 101 and also stores various pieces of information.

The ROM 152 stores fixed data such as control programs to be executed by the CPU 154, a data table, and an embedded OS. In the present exemplary embodiment, the control programs stored in the ROM 152 perform software execution control such as scheduling, task switching, and interrupt processing under control of the embedded OS stored in the ROM 152.

The CPU 154 is a system control unit and controls the entire MFP 151.

The print engine 155 performs printing processing for applying a recording agent such as ink to a recording medium such as a sheet to form an image on the recording medium based on the information stored in the RAM 153 or the print information received from the mobile terminal 101. Then, the print engine 155 outputs the printing result. Generally, the amount of data of a print job transmitted from the mobile terminal 101 is large, and thus the print job is desirably communicated using a communication method capable of high-speed communication. Accordingly, the MFP 151 receives the print job via the communication unit 156 that can communicate faster than the short-range wireless communication unit 157. The printing using ink is merely an example, and printing may be performed by an electrophotographic method using toner. Regarding ink, a cartridge MFP to which a cartridge is attached, or an ink supply MFP in which ink is supplied from an ink bottle to an ink tank may be used.

A memory such as an external hard disk drive (HDD) or a Secure Digital (SD) card may be attached as an optional device to the MFP 151. Information stored in the MFP 151 may also be stored in this memory.

The input interface 158 receives input data or an operation instruction from the user operating the operation unit 159 such as physical buttons. The operation unit 159 may be a software keyboard or software buttons displayed on the display unit 161.

In other words, the input interface 158 may receive an input (an operation) from the user through the display unit 161.

The output interface 160 controls the display unit 161 to display data or provide a notification of the state of the MFP 151.

The display unit 161 includes an LED or an LCD. The display unit 161 displays data or provides a notification of the state of the MFP 151.

The USB interface 163 controls a USB connection via a USB cable. More specifically, the USB interface 163 connects to an apparatus such as the mobile terminal 101 or the external access point 131 via a USB cable to perform data communication.

Figure 3:
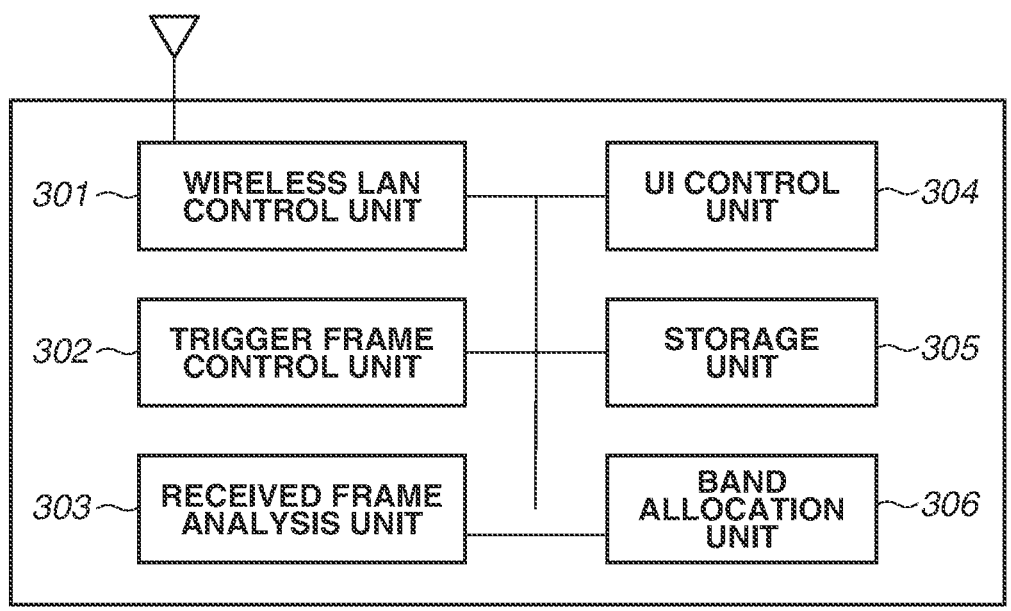
FIG. 3 is a block diagram illustrating an example of a functional configuration of an access point.

FIG. 3 is a block diagram illustrating an example of a functional configuration of the AP 131. For example, the AP 131 includes, as functional components, a wireless LAN control unit 301, a trigger frame control unit 302, a received frame analysis unit 303, a user interface (UI) control unit 304, a storage unit 305, and a band allocation unit 306.

The wireless LAN control unit 301 performs control to transmit and receive a wireless signal to and from another wireless LAN communication apparatus. The wireless LAN control unit 301 can be implemented by, for example, a program for controlling a base band circuit or a radio frequency (RF) circuit and an antenna for WLAN. The wireless LAN control unit 301 performs WLAN communication control according to the IEEE 802.11 standard series and performs wireless communication with a station (STA) compliant with the IEEE 802.11 standard series.

The trigger frame control unit 302 performs control to transmit a trigger frame to a successfully authenticated STA via the wireless LAN control unit 301. Upon receiving a trigger frame, the STA transmits an uplink (UL) frame as a response to the trigger frame. Upon receiving the UL frame via the wireless LAN control unit 301, the AP 131 causes the received frame analysis unit 303 to interpret the content of the received UL frame. For example, if the received UL frame includes access category (AC) information, the received frame analysis unit 303 acquires the information through analysis and identifies which AC corresponds to transmission target data held by the STA having transmitted the UL frame.

Based on the information acquired by the received frame analysis unit 303, the band allocation unit 306 determines the width of the frequency band to be allocated for each STA to transmit data, the center frequency of the frequency band, and the time in which the frequency band is to be allocated. In other words, the band allocation unit 306 determines the frequency range where a wireless resource is to be allocated to each STA, and the timing at which the wireless resource is allocated to each STA. The trigger frame control unit 302 notifies each STA of information indicating the allocation determined by the band allocation unit 306, using a trigger frame and causes the STA to transmit a UL frame based on the allocation.

The UI control unit 304 is implemented, for example, by a program for controlling user interface hardware, such as a touch panel or buttons, which receives an operation performed by a user (not illustrated) of the AP 131. The UI control unit 304 can also have a function of presenting information such as image display information or sound output information to the user. The storage unit 305 is a storage function including a ROM and a RAM that store programs and data for operation of the AP 131.

According to the IEEE 802.11ax standard, a frequency band can be allocated in a size smaller than the conventional 20 MHz band, whereby many terminals can simultaneously use the wireless resource. Such allocation of the wireless resource is performed using orthogonal frequency-division multiple access (OFDMA).

According to the IEEE 802.11ax standard, for example, the 20 MHz bandwidth is divided into nine blocks each including 26 sub-carriers (tones) that do not overlap each other on a frequency axis, thereby allocating the wireless resource to terminals in block units. Each of the blocks as the allocation units is referred to as a "resource unit (RU)", and the size of the RU can be determined depending on the frequency bandwidth and the number of terminals to which the wireless resource is to be allocated. The size of the RU is represented in the unit of the number of tones, and values, for example, 26, 52, 106, 242, 484, 996, and 2×996 can be used. In the 20 MHz bandwidth, values less than or equal to 242 among these values can be used. In a case where the entire 20 MHz bandwidth is allocated to a single terminal, a maximum of 242 tones can be allocated to the terminal. On the other hand, for example, in a case where the 20 MHz bandwidth is simultaneously used by nine terminals, 26 tones are allocated to each of the terminals. In this manner, the frequency band is divided into blocks each having 26 tones, which is the minimum allocation unit, whereby nine terminals can simultaneously communicate using the 20 MHz bandwidth. Similarly, in a case where the 40 MHz, 80 MHz, and 160 MHz frequency bandwidths are used, a maximum of 18, 37, and 74 terminals, respectively, can simultaneously communicate.

Figure 4:
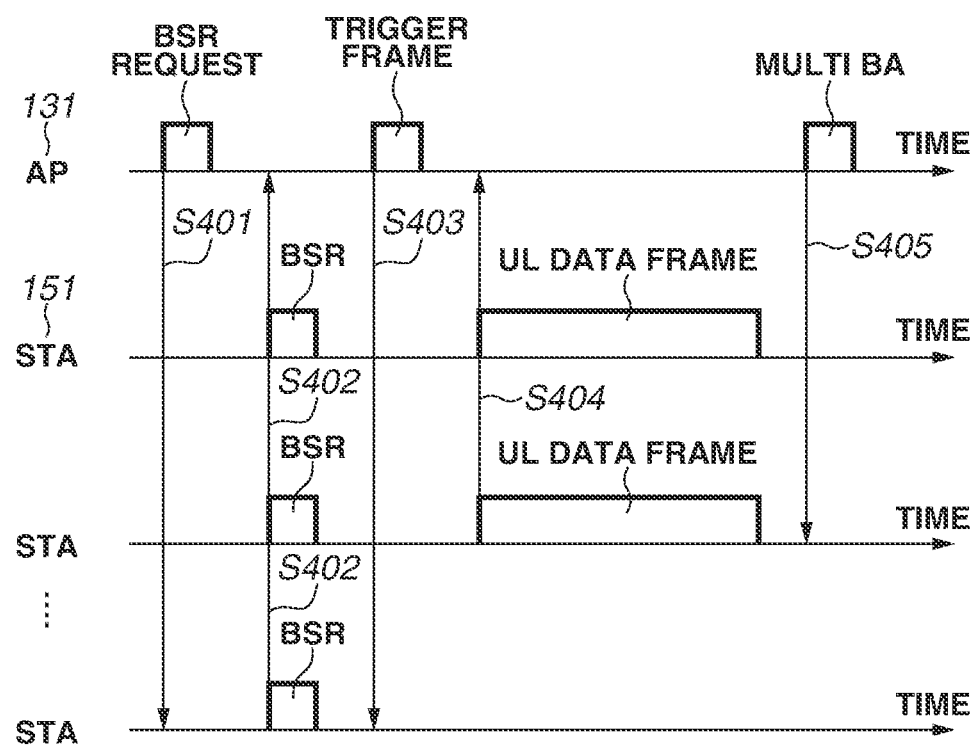
FIG. 4 is a diagram illustrating an example of communication processing according to the present exemplary embodiment.
Figure 5:
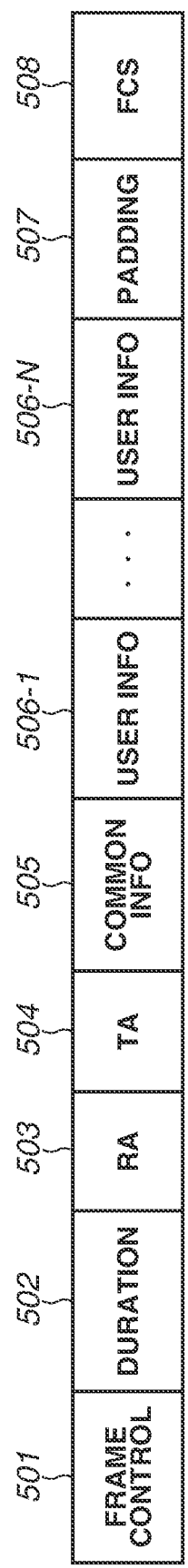
FIG. 5 is a diagram illustrating an example of a frame structure.

Next, a basic procedure for multi-user (MU) communication using a UL will be described with reference to FIG. 4. In step S401, the AP 131 causes the trigger frame control unit 302 to transmit a buffer status report request (a BSR request) to each STA. FIG. 5 illustrates an example of a structure of a frame transmitted at this time. In the example of FIG. 5, the frame includes information fields 501 to 508. Fields of the frame that are unrelated to the description in the present exemplary embodiment will not be described below. In the present exemplary embodiment, the AP 131, the MFP 151, and the mobile terminal 101 can perform communication according to the IEEE 802.11ax standard.

Referring back to FIG. 4, in step S402, each STA transmits a BSR to the AP 131. In this step, each STA notifies the AP 131 of the presence or absence of data to be transmitted.

In step S403, upon receiving the BSR from each STA, the AP 131 transmits a trigger frame for urging the transmission of UL data, based on the information of the BSR. The frame transmitted at this time also has a format such as that in FIG. 5. In the example of FIG. 5, the field 501 (the "Frame Control" field 501) is, for example, a field that stores a value indicating a trigger frame compliant with the IEEE 802.11ax standard. FIG. 6 illustrates an example of a data structure of the field 505 (the "Common Info" field 505). In the example of FIG. 6, the "Common Info" field 505 includes information sub-fields 601 to 609. The sub-field 601 (the "Trigger Type" sub-field 601) stores "0". The sub-field 602 (the "UL Length" sub-field 602) stores a value corresponding to a communication period common to all STAs. This value indicates the amount of data that can be transmitted by each STA. If the value of the "Trigger Type" sub-field 601 is "0", the fields 506 (the "User Info" fields 506-1 to 506-N) are added to the frame illustrated in FIG. 5. The "User Info" fields 506-1 to 506-N will be described in detail with reference to FIG. 7. The "User Info" fields 506-1 to 506-N each include information sub-fields 701 to 709 as illustrated in FIG. 7. The sub-field 701 (the "AID12" sub-field 701) identifies an STA, and an index value indicated by the sub-field 702 (the "RU Allocation" sub-field 702) identifies an RU and a tone size to be allocated to the STA. The "tone size" refers to a value indicating the width of the frequency band that can be allocated to each STA.

The AP 131 reserves a communication channel in order to transmit the trigger frame. Then, the AP 131 divides the reserved communication channel into a plurality of resource units in a frequency domain and allocates the resource units to terminals.

The description returns to FIG. 6. The sub-field 604 (the "Carrier Sense (CS) Required" sub-field 604) has a length of one bit. The "CS Required" sub-field 604 stores information indicating whether to execute carrier sense. Thus, if the "CS Required" sub-field 604 includes information indicating that carrier sense is to be executed, a communication apparatus having received the trigger frame executes carrier sense. If the "CS Required" sub-field 604 includes information indicating that carrier sense is not to be executed, a communication apparatus having received the trigger frame does not execute carrier sense.

In step S404, upon receiving the trigger frame, each STA transmits a UL data frame in the range of the amount of data specified by the "UL Length" sub-field 602 of the trigger frame. At this time, if the "CS Required" sub-field 604 includes information indicating that carrier sense is to be executed, the STA executes carrier sense and then performs the processing in step S404. If the AP 131 receives a physical layer (PHY) protocol data unit (PPDU) from each STA, then in step S405, the AP 131 transmits a Multi Block Ack (Multi BA) as a reception acknowledgement.

Next, an operation performed by the MFP 151 will be described with reference to FIG. 8. It is assumed that, in the MFP 151, both the infrastructure mode and the P2P mode are enabled/set according to an instruction from the user.

For example, the user instructs the MFP 151 to enable the infrastructure mode and enable the Wi-Fi Direct® mode, so that the infrastructure mode and the Wi-Fi Direct® mode are both enabled. The MFP 151 also operates as the master station (e.g., a Wi-Fi Direct® group owner) in the P2P communication. The MFP 151 is assumed to receive the trigger frame from the AP 131 in step S403. In a case where the infrastructure communication and the P2P communication are both enabled, the MFP 151 may refer to a communication channel used in the infrastructure communication and the MFP 151, as the master station, may construct a network so that the P2P communication is performed using the same communication channel. Alternatively, in a case where the infrastructure communication and the P2P communication are both enabled, the MFP 151 may refer to a communication channel used in the infrastructure communication and the MFP 151, as the master station, may construct a network so that the P2P communication is performed using a different communication channel from the communication channel used in the infrastructure communication. In other words, in the example of FIG. 8, while the infrastructure mode and the P2P mode are both enabled, the MFP 151 receives the trigger frame compliant with the IEEE 802.11 standard and including information regarding the execution of carrier sense from the external access point 131 in step S403.

In step S801, since the MFP 151 operates as the master station, the MFP 151 transmits a trigger frame. The MFP 151 divides a single communication channel (e.g., a 20 MHz communication channel) into a plurality of resource units and allocates the resource units to STAs including the mobile terminal 101, using a trigger frame such as that described above with reference to FIG. 5. In other words, the "RU Allocation" sub-field 702 of the trigger frame transmitted from the MFP 151 includes information regarding the allocation of the resource units. The "CS Required" sub-field 604 of the trigger frame transmitted from the MFP 151 includes information indicating that carrier sense is to be executed. The number of slave station apparatuses to which the resource units are allocated by the MFP 151 is the maximum number of slave stations that can be maintained in parallel in the direct connection. For example, if the communication unit 156 can maintain P2P wireless connections with a maximum of three slave station apparatuses in parallel, the maximum number of slave station apparatuses to which the resource units are allocated is three. In other words, the maximum number of apparatuses to which the resource units are allocated that is specified in the trigger frame transmitted in step S801 is equal to the maximum number of slave stations that can be maintained in parallel in the direct connection. In step S802, the mobile terminal 101 transmits data to the MFP 151. At this time, the mobile terminal 101 transmits the data using the resource unit allocated by the trigger frame. In the present exemplary embodiment, since the information indicating that carrier sense is to be executed is set in the trigger frame, the mobile terminal 101 executes carrier sense and then transmits the data to the MFP 151. The MFP 151 can notify the mobile terminal 101 of the remaining amount of a consumable product (ink or toner) through the direct connection. This enables an application operating on the mobile terminal 101 to display the remaining amount of the consumable product. Other states of the MFP 151 may be communicated through the direct connection. Examples of other states include the absence of sheets, the opening of a cover of the MFP 151, and an error (a paper jam) in the MFP 151. The MFP 151 transmits a Multi Block Ack (Multi BA) as a reception acknowledgement in step S803.

Next, processing performed by the MFP 151 will be described with reference to a flowchart in FIG. 9. The flowchart according to the present exemplary embodiment is implemented by the CPU 154 reading a program related to the processing in the flowchart from the ROM 152 and executing the program.

In step S901, the CPU 154 receives from the AP 131 the trigger frame described above in step S403 in FIG. 4. In step S902, the CPU 154 determines whether to execute carrier sense. The CPU 154 implements the processing in step S902 by referring to the information in the "CS Required" sub-field 604 in FIG. 6. If the CPU 154 determines not to execute carrier sense (NO in step S902), then in step S905, the CPU 154 transmits transmission target data to a destination apparatus via the AP 131 without executing carrier sense.

If the CPU 154 determines to execute carrier sense (YES in step S902), then in step S903, the CPU 154 executes carrier sense. In step S904, the CPU 154 senses the energy (the power) of radio waves generated in the communication channel used in the communication with the AP 131. Then, the CPU 154 determines whether the sensed energy is greater than or equal to a threshold. If the CPU 154 determines that the energy of the radio waves generated in the communication channel is greater than or equal to the threshold (NO in step S904), the CPU 154 determines that the CPU 154 is unable to transmit data to the AP 131. Then, the processing returns to step S903. Alternatively, if the CPU 154 determines that the energy of the radio waves generated in the communication channel is greater than or equal to the threshold (NO in step S904), the CPU 154 may skip the processing of step S905 and proceed to step S906.

If the CPU 154 determines that the power generated in the communication channel is less than the threshold (YES in step S904), the CPU 154 determines that the CPU 154 is able to transmit data to the AP 131. In step S905, the CPU 154 transmits the transmission target data to the destination apparatus via the AP 131. For example, scan data obtained by the MFP 151 reading a document, or status information regarding the MFP 151 is transmitted in step S905. The CPU 154 transmits the transmission target data using the resource unit allocated to the MFP 151 by the "RU Allocation" sub-field 702.

In step S906, the CPU 154 determines whether the MFP 151 is to operate as the master station for direct communication. For example, if the user instructs the MFP 151 to enable Wi-Fi Direct® and the MFP 151 is determined to operate as the group owner as a result of a negotiation (an intent value comparison) with a communication partner apparatus in the Wi-Fi Direct® mode, the CPU 154 determines that the MFP 151 is to operate as the master station for direct communication (YES in step S906). Also, if the user instructs the MFP 151 to enable the software AP mode, the CPU 154 determines that the MFP 151 is to operate as the master station for direct communication (YES in step S906).

In step S907, the CPU 154 causes the MFP 151 to operate as the master station for direct communication. In step S908, the CPU 154 generates a trigger frame including information indicating that CS is to be executed. In step S909, the CPU 154 transmits the trigger frame to a slave station (e.g., the mobile terminal 101) connected to the CPU 154. At this time, the MFP 151 sets the information indicating that carrier sense is to be executed in the "CS Required" sub-field 604 in FIG. 6, and transmits the trigger frame illustrated in FIG. 5. The CPU 154 also allocates the resource unit to be used by the apparatus (e.g., the mobile terminal 101) connected to the MFP 151, using the "RU Allocation" sub-field 702. In this case, the mobile terminal 101 executes carrier sense and then transmits data to the MFP 151 using the allocated resource unit. For example, the mobile terminal 101 transmits print data to the MFP 151 using the allocated resource unit.

While FIG. 9 illustrates the procedure in which the processing in steps S906 to S908 is performed after the processing in steps S901 to S905, the CPU 154 may perform the processing in reverse order. In other words, after the processing in steps S906 to S908 is performed first, the processing in steps S901 to S905 may be performed. Alternatively, the processing in steps S901 to S905 and the processing in steps S906 to S908 may be performed in parallel.

If the infrastructure communication is disabled and the direct communication is enabled, the CPU 154 may perform only the processing in steps S906 to S908.

The MFP 151 may perform the processing in step S908 based on the information indicating whether to execute carrier sense that is included in the trigger frame transmitted from the AP 131. In other words, if the CPU 154 determines to execute CS in step S902, then in step S908, the MFP 151 generates a trigger frame including information indicating that CS is to be executed. If the CPU 154 determines not to execute CS in step S902, then in step S908, the MFP 151 generates a trigger frame including information indicating that CS is not to be executed.

According to the present exemplary embodiment, if the MFP 151 is instructed to execute carrier sense by the AP 131, the MFP 151 transmits a trigger frame indicating that carrier sense is to be executed, to a slave station connected to the MFP 151. This enables slave stations including the mobile terminal 101 to execute carrier sense and then transmit data such as print data, thereby making it possible to appropriately transmit data.

The present exemplar embodiment can also be implemented by processing of supplying a program for implementing one or more functions according to the above exemplary embodiment to a system or an apparatus via a network or a storage medium, and causing one or more processors of a computer of the system or the apparatus to read and execute the program. The present exemplary embodiment can also be implemented by a circuit (e.g., an application-specific integrated circuit (ASIC)) for implementing the one or more functions.

According to the exemplary embodiments of the present invention, it is possible to provide a more efficient wireless communication technique.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A communication apparatus comprising:
at least one memory and at least one processor and/or at least one circuit which function as:
a communication control unit configured to enable at least one of a first mode for performing wireless communication via an external access point, wherein the external access point is located outside the communication apparatus, and a second mode in which wireless communication is not performed via the external access point outside the communication apparatus; and
a transmission unit configured to, in a case where the communication apparatus operates as a master station that is configured to determine a communication channel to be used in the wireless communication in the second mode while at least the second mode is enabled, transmit a trigger frame compliant with the Institute of Electrical and Electronics Engineers (IEEE) 802.11 standard to a slave station apparatus connected to the master station, the trigger frame including information indicating that carrier sense is to be executed.

2. The communication apparatus according to claim 1, wherein the trigger frame includes the information indicating that the carrier sense is to be executed and information regarding allocation of one or more resource units.

3. The communication apparatus according to claim 2, wherein the maximum number of apparatuses to which the one or more resource units are allocated that is specified in the trigger frame is equal to the maximum number of slave station apparatuses that are maintainable in parallel in the wireless communication in the second mode.

4. The communication apparatus according to claim 3, wherein the communication apparatus operating as the master station maintains wireless connections with a predetermined number or less than the predetermined number of slave station apparatuses in parallel in the second mode.

5. The communication apparatus according to claim 1, wherein the communication control unit is configured to enable both the first mode and the second mode, and wherein the wireless communication in the first mode and the wireless communication in the second mode are performed using the same communication channel.

6. The communication apparatus according to claim 1, wherein the communication control unit is configured to enable both the first mode and the second mode, and wherein the wireless communication in the first mode and the wireless communication in the second mode are performed using different communication channels.

7. The communication apparatus according to claim 1, wherein the communication apparatus performs wireless communication using a frequency band selected from among 2.4 GHZ, 5 GHZ, and 6 GHz.

8. The communication apparatus according to claim 1, wherein, in a case where the communication apparatus operates as the master station in the second mode while the first mode and the second mode are enabled, the transmission unit is configured to transmit the trigger frame compliant with the IEEE 802.11 standard to the slave station apparatus, the trigger frame including the information indicating that the carrier sense is to be executed.

9. The communication apparatus according to claim 1, wherein the at least one memory and the at least one processor and/or the at least one circuit further function as:
a reception unit configured to receive a trigger frame compliant with the IEEE 802.11 standard from the external access point while the first mode and the second mode are enabled, the trigger frame including information regarding execution of the carrier sense; and
a second transmission unit configured to, in a case where the trigger frame received from the external access point includes the information indicating that the carrier sense is to be executed, execute the carrier sense, and then transmit data.

10. The communication apparatus according to claim 9, wherein the at least one memory and the at least one processor and/or the at least one circuit further function as a reading unit configured to scan a document to acquire scan data,
wherein in a case where the second transmission unit executes the carrier sense and determines that sensed energy is less than a threshold, the second transmission unit transmits the scan data using one or more resource units allocated to the communication apparatus by the trigger frame from the external access point.

11. The communication apparatus according to claim 1, wherein the at least one memory and the at least one processor and/or the at least one circuit further function as a printing processing unit configured to perform control to execute printing processing on a sheet based on print data received from the slave station apparatus.

12. A printing apparatus comprising:
at least one memory and at least one processor and/or at least one circuit which function as:
a communication control unit configured to enable a mode in which wireless communication is not performed via an external access points outside the printing apparatus; and
a transmission unit configured to, in a case where the printing apparatus operates as a master station that is configured to determine a communication channel to be used in the wireless communication while the mode is enabled, transmit a trigger frame compliant with the Institute of Electrical and Electronics Engineers (IEEE) 802.11 standard to a slave station apparatus connected to the master station, the trigger frame including information indicating that carrier sense is to be executed.

13. A method for a communication apparatus, the method comprising:
enabling at least one of a first mode for performing wireless communication via an external access point, wherein the external access point is located outside the communication apparatus, and a second mode in which wireless communication is not performed via the external access point outside the communication apparatus; and
in a case where the communication apparatus operates as a master station that is configured to determine a communication channel to be used in the wireless communication in the second mode while at least the second mode is enabled, transmitting a trigger frame compliant with the Institute of Electrical and Electronics Engineers (IEEE) 802.11 standard to a slave station apparatus connected to the master station, the trigger frame including information indicating that carrier sense is to be executed.

14. A non-transitory computer readable storage medium storing instructions for causing a computing device to perform a process comprising:
enabling at least one of a first mode for performing wireless communication via an external access point, wherein the external access point is located outside the communication apparatus, and a second mode in which wireless communication is not performed via the external access point outside the communication apparatus; and
in a case where the communication apparatus operates as a master station that is configured to determine a communication channel to be used in the wireless communication in the second mode while at least the second mode is enabled, transmitting a trigger frame compliant with the Institute of Electrical and Electronics Engineers (IEEE) 802.11 standard to a slave station apparatus connected to the master station, the trigger frame including information indicating that carrier sense is to be executed.

15. A method for a printing apparatus, the method comprising:
enabling a mode in which wireless communication is not performed via an external access points outside the printing apparatus; and
in a case where the printing apparatus operates as a master station that is configured to determine a communication channel to be used in the wireless communication while the mode is enabled, transmitting a trigger frame compliant with the Institute of Electrical and Electronics Engineers (IEEE) 802.11 standard to a slave station apparatus connected to the master station, the trigger frame including information indicating that carrier sense is to be executed.

16. A non-transitory computer readable storage medium storing instructions for causing a computing device to perform a process comprising:

enabling a mode in which wireless communication is not performed via an external access points outside the printing apparatus; and in a case where the printing apparatus operates as a master station that is configured to determine a communication channel to be used in the wireless communication while the mode is enabled, transmitting a trigger frame compliant with the Institute of Electrical and Electronics Engineers (IEEE) 802.11 standard to a slave station apparatus connected to the master station, the trigger frame including information indicating that carrier sense is to be executed.

\* \* \* \* \*